United States Patent Office.

JOHN RILEY, OF TROY, NEW YORK, ASSIGNOR TO THE UNITED STATES AND FOREIGN SALAMANDER FELTING COMPANY.

Letters Patent No. 108,055, dated October 4, 1870.

IMPROVEMENT IN COMPOSITIONS FOR COVERING STEAM-BOILERS, AND FOR OTHER PURPOSES.

The Schedule referred to in these Letters Patent and making part of the same.

*To all whom it may concern:*

Be it known that I, JOHN RILEY, of Troy, in the county of Rensselaer and State of New York, have made a new and useful Improvement in Composition for covering steam-boilers, steam-pipes, hot-air pipes, for the manufacture of roofing-tiles, roofing, fire-brick lining, puddling, heating and blast-furnaces, filling safes and refrigerators, and for similar purposes to which the material is adapted; and I hereby declare the following to be a full and exact description of the same.

In patent No. 95,517, issued October 5, 1869, is described a composition made of lime-putty, with fibrous material and various earth substances. I have made certain improvements and modifications in the composition described in said patent, thereby making the same more useful and applicable to a greater variety of purposes, as hereafter more fully set forth.

The first part of my invention consists in combining gypsum or ground plaster, such as used for fertilizing, with or without lime-putty, and any suitable fibrous material, such as vegetable fiber, hair, or asbestos, which will give the composition sufficient tenacity. The lime-putty serves as the cement; the fibrous materials hold the composition together; the gypsum or ground plaster is non-combustible and gives the composition greater plasticity, and takes a good finish. Any good materials in powder, such as sand, clay, ashes, powdered charcoal, black lead, soapstone, plaster Paris, and pumice-stone, chalk, hydraulic cement may be added to fill up and increase the bulk, preference being given to such as will resist heat, and are poor conductors of heat, and for all portable structures, such as produce light porous compounds, should be chosen.

The second part of my invention consists in mixing a small proportion of animal or vegetable oil with the compounds produced by combining lime-putty and the various fibrous and earthy material herein named.

The following directions will serve to prepare the composition suitable for boiler-covering:

A good proportion is that given in the patent above named, adding about one part of gypsum or ground plaster, and one of pumice-stone, to three parts of paper-pulp, or other fibrous material. When the composition is to resist high temperatures, as in superheating pipes, the vegetable or animal fiber, when oil is used, from one to two per cent. will be sufficient. This composition may also be employed in filling safes and refrigerators, but should be thoroughly dried when the temperature to be resisted is not above 350° Fahrenheit.

The following composition will make a good boiler-covering:

Paper-pulp, one barrel; lime-putty, one barrel; charcoal-facing, one-eighth of a barrel; gypsum or ground plaster, pumice-stone, or other hard material, one-quarter of a barrel.

To resist high temperatures, a good composition is asbestos, crushed, one barrel; ground plaster or lime-putty, four barrels; charcoal, powdered, one-half a barrel.

I do not limit myself to these proportions, as they may be varied without separating from the principles of my invention.

The following description will serve for the composition for the manufacture of fire-brick;

For fire-brick, two parts of asbestos and two parts of ground plaster should be combined with one of pumice-stone, and strongly pressed in molds. The same compound may be used for lining and coating furnaces, but should be thinner, so as to be plastered on.

When applied in lining furnaces it may be plastered over the fire-bricks, or other lining, and will protect the same.

In the manufacture of roofing-tiles and roofing, the composition should be varied as follows:

For roofing and roofing-tiles, the composition should be the same as for boiler-coverings, but should be pressed into a compact mass, and drying oils, if any should be used, and a coating of any suitable paint may be added.

Having thus described my invention,

What I claim, and desire to secure by Letters Patent of the United States, is—

1. The composition, herein described, for covering steam-boilers, pipes, and the like, made by combining ground gypsum or plaster and any suitable fibrous material by means of lime-putty or equivalent cement.

2. Roofing and roofing-tiles, made by combining either paper-pulp, vegetable fiber, hair, asbestos, or other suitable fibrous material with lime-putty, substantially as described.

3. The improved composition, herein described, for lining and coating metallurgic and other furnaces, made by combining asbestos, lime-putty, and plaster, or its equivalent, as described.

4. The improved fire-brick, herein described, made by combining asbestos and ground gypsum by means of lime-putty, or other calcareous cement.

5. The compounds, herein described, made by combining the materials named, in the manner and substantially in the proportions set forth, and for the purpose specified.

6. The combination of oil with ground gypsum, lime-putty, and fibrous materials, substantially as specified.

In testimony whereof, I have hereto set my hand this 5th day of September, 1870.

JOHN RILEY.

Witnesses:
C. D. KELLUM,
WILLIAM H. MERRIAM.